No. 671,601. Patented Apr. 9, 1901.
I. N. LACHNER.
VEHICLE DEVICE FOR HITCHING HORSES.
(Application filed Aug. 31, 1900.)
(No Model.)

Witnesses
Inventor
Ida N. Lachner
by H. B. Willson & Co.
Attorneys

UNITED STATES PATENT OFFICE.

IDA N. LACHNER, OF BAKER CITY, OREGON.

VEHICLE DEVICE FOR HITCHING HORSES.

SPECIFICATION forming part of Letters Patent No. 671,601, dated April 9, 1901.

Application filed August 31, 1900. Serial No. 28,673. (No model.)

*To all whom it may concern:*

Be it known that I, IDA N. LACHNER, a citizen of the United States, residing at Baker City, in the county of Baker and State of Oregon, have invented certain new and useful Improvements in Vehicle Devices for Hitching Horses; and I do declare the following to be a full, clear, and exact description of the invention, such as will enable others skilled in the art to which it appertains to make and use the same.

The invention relates to devices for preventing horses from running away.

The object of the invention is to provide a simple, durable, and inexpensive device of this character which may be easily and quickly attached to vehicles now in general use and by the employment of which teams left standing will be effectually prevented from running away.

With this object in view the invention consists in certain features of construction and combination of parts, which will be hereinafter fully set forth.

Figure 1:
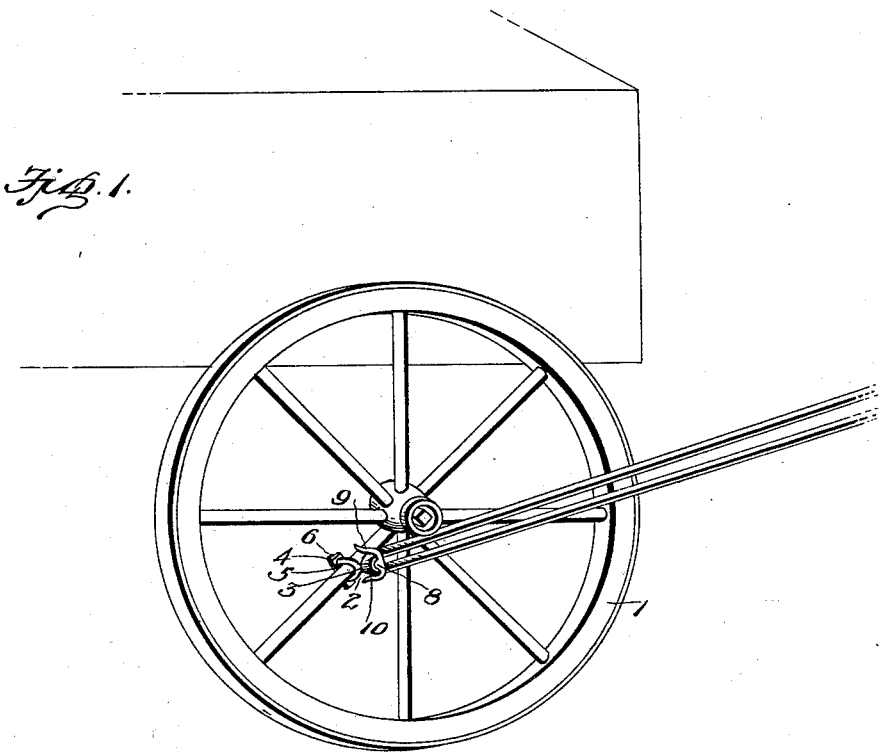
Figure 2:
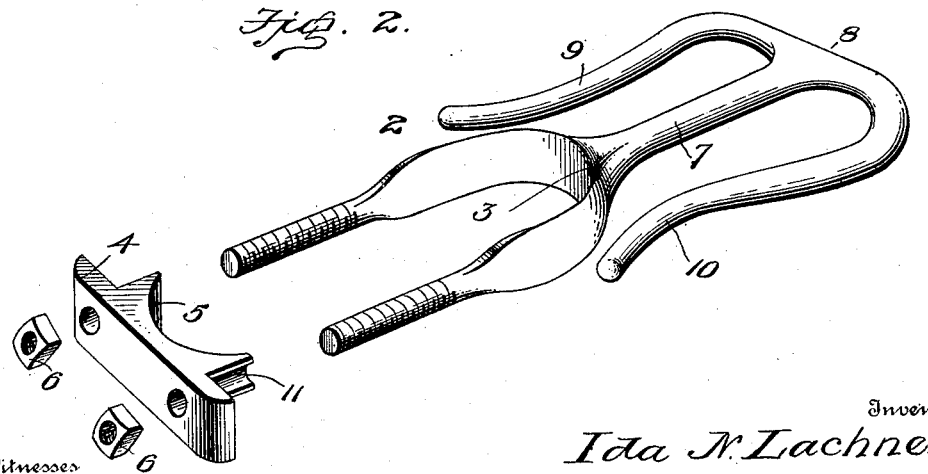

In the accompanying drawings, Figure 1 is a view of a portion of a vehicle, illustrating the application of my invention; and Fig. 2 is an enlarged detail perspective view showing the parts of the device separated.

Referring to the drawings, 1 denotes one of the front wheels of a vehicle, and 2 denotes my improved device. The device consists of a clip composed of the yoke 3, the clip-plate 4, the integral block 5, and the nuts 6. The forward end of the yoke is formed with an extension 7, which terminates in a double hook 8, the bills 9 and 10 of which are arranged on opposite sides of the extension and project rearwardly. The block 5 has its inner face curved to embrace the curved surface of the spoke, and thereby prevent marring of the same, and the ends of this block are formed with longitudinal grooves 11 to act as guides for inserting the screw-threaded ends of the yoke into the clip-plate 4.

This device is attached to one of the spokes of the front wheels, either on the inside or outside of the wheel. When the driver leaves the vehicle, he slips the connected ends of the reins over the double hook. Should the team start off, the reins will be wound about the hub of the wheel (if the device is attached to the outside of the wheel) or will be wound about the axle, (if the device is attached to the inside of the wheel,) thus tightening the reins and bringing the team to a full stop if the reins remain intact.

By a slight modification of the parts the device may be used as a whiffletree-hook, although it is primarily designed for and is herein shown as a means for preventing a a team starting off when unattended by the driver.

From the foregoing description, taken in connection with the accompanying drawings, the construction, operation, and advantages of the invention will be readily understood without requiring an extended explanation.

The device is exceedingly useful for the purpose for which it is designed and may be placed upon the market at a comparatively small cost.

Various changes in the form, proportion, and the minor details of construction may be resorted to without departing from the principle or sacrificing any of the advantages of this invention.

Having thus fully described my invention, what is claimed, and desired to be secured by Letters Patent, is—

1. The combination with a yoke provided with a forwardly-projecting extension terminating in rearwardly-projecting hooks, of a clip-plate having a block formed with a curved surface, and nuts screwed upon the ends of the yoke for clamping the clip-plate in position, substantially as set forth.

2. The combination with a yoke provided with a forwardly-projecting extension terminating in rearwardly-projecting hooks, of a clip-plate having a block formed with a curved surface, and nuts screwed upon the ends of the yoke for clamping the clip-plate in position, said block being provided with longitudinal grooves to facilitate the introduction of the ends of the yoke through the apertures of the clip-plate, substantially as set forth.

In testimony whereof I have hereunto set my hand in presence of two subscribing witnesses.

IDA N. LACHNER.

Witnesses:
W. G. DROWLEY,
WM. J. LACHNER.